United States Patent [19]
Wooden

[11] 3,867,055
[45] Feb. 18, 1975

[54] CIRCULAR CLAMP FOR TUBES
[75] Inventor: John A. Wooden, Indianapolis, Ind.
[73] Assignee: Brookside Corporation, McCordsville, Ind.
[22] Filed: Nov. 12, 1973
[21] Appl. No.: 414,823

[52] U.S. Cl. .............. 403/373, 24/20 S, 403/377, 416/221
[51] Int. Cl. ............................................. F16b 2/08
[58] Field of Search .......... 403/373, 344, 361, 377, 403/110, 372, 255; 339/103; 24/19, 20 S, 20 R, 20 TT, 20 EE, 256, 259 C, 257 R; 308/236; 100/212; 416/214, 221

[56] References Cited
UNITED STATES PATENTS
| | | | |
|---|---|---|---|
| 2,869,651 | 1/1959 | Rose | 403/252 |
| 3,293,709 | 12/1966 | Holton | 24/20 TT |
| 3,392,996 | 7/1968 | Dunn, Jr. et al. | 403/373 |

*Primary Examiner*—Werner H. Schroeder
*Attorney, Agent, or Firm*—Woodard, Weikart, Emhardt & Naughton

[57] ABSTRACT

Disclosed is a one-piece, circularly formed resilient band having overlapping end portions. The band grips a tubular member, such as hose or fan hub, and locks the tubular member on a concentric member extending into the tubular member. The overlapping end portions of the band each has an aperture, the apertures being in register over a portion of their area and interfitting abutment surfaces are provided on the band to permit the band to be sprung or skewed into a released position by inserting and twisting a screwdriver tip in the registering band apertures. A plastic fan hub is herein disclosed as the tubular member and the fan drive shaft is the concentric member. The clamp could also be utilized as a hose clamp, on plastic blower wheel hubs and similar applications.

8 Claims, 10 Drawing Figures

PATENTED FEB 18 1975  3,867,055
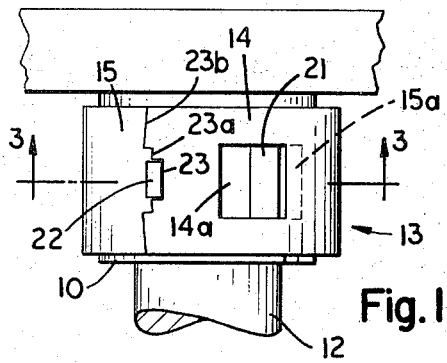
Fig.1
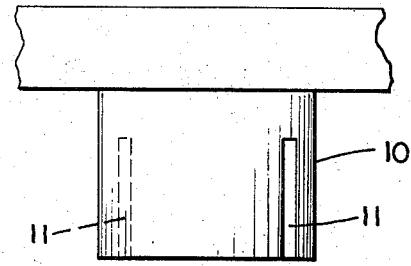
Fig.2
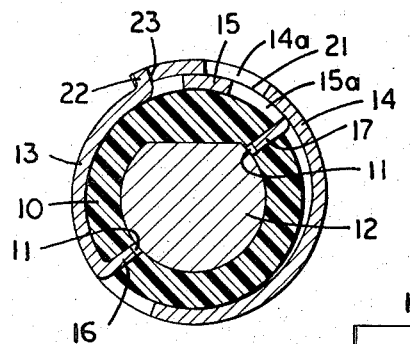
Fig.3
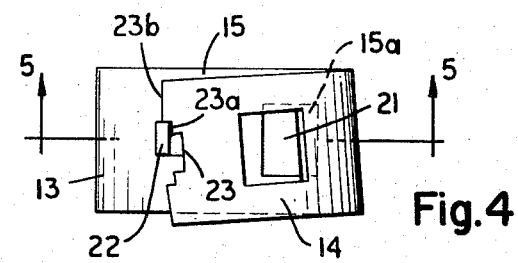
Fig.4
Fig.4A
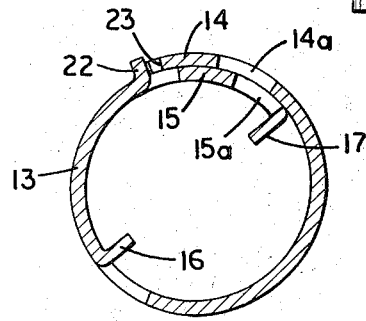
Fig.5
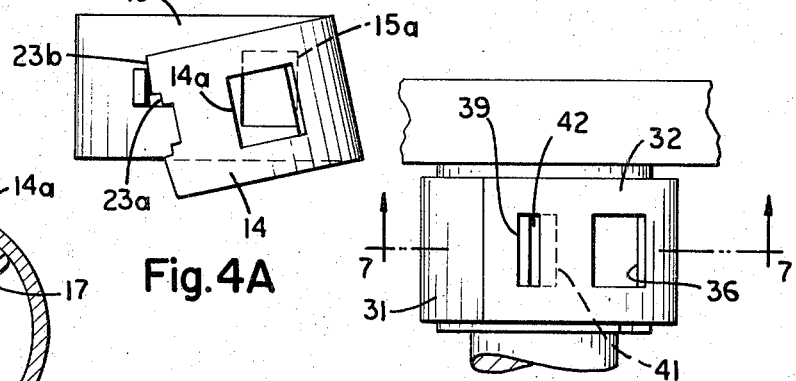
Fig.6
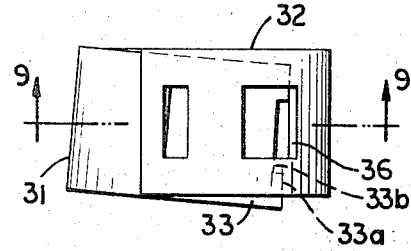
Fig.8
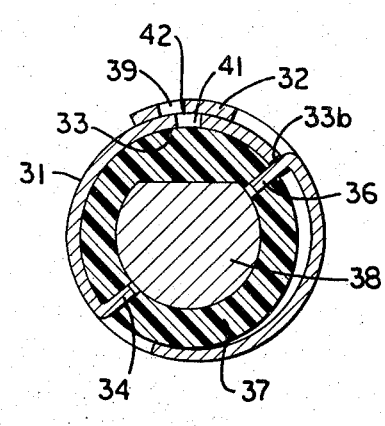
Fig.7
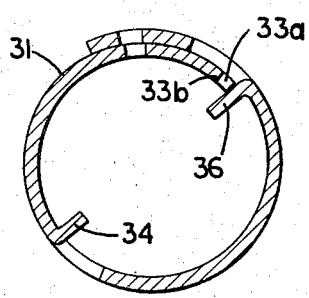
Fig.9

CIRCULAR CLAMP FOR TUBES

BACKGROUND OF THE INVENTION

In order to minimize the cost of fabrication and assembly of air moving elements such as fans and blower wheels, the use of molded plastic in forming the fan spider or blower wheel has greatly increased. It is desirable that such plastic fan elements be supported on plastic hubs to facilitate bonding of the fan element and hub, to maintain the minimum overall weight of the complete assembly and to retain the cost advantage of molded plastic components over metal hubs.

The fans and their integral or attached hubs are often shipped to an assembly plant for incorporation into air conditioners or the like and it is desirable that the clamp, used to rigidly attach or mount the hub on the driving shaft and with which the fan has been dynamically balanced, be in place on the hub during shipment. However, if the clamp is in fully closed or clamping position on the hub during such shipment or storage, distortion of the plastic hub may occur which creates difficulties in final assembly of the apparatus.

The clamp of the present invention is retained, in unlocked or open position, on its hub during shipment or storage. In one form of the clamp of the present invention an intermediate position for the clamp element is provided, and in this position the clamp exerts some compressive force on the tubular element so as to maintain it in place during shipment, or during progress of the apparatus down an assembly line. A twist of a screwdriver tip is sufficient to place the clamp in fully closed position, locking the hub on a drive shaft. The clamp is thin, flat and substantially symmetrical when in closed position, so that it does not cause balancing problems for the fan when utilized on fan hubs or blower whell hubs. The clamp can not only be opened conveniently, as pointed out above, but is held or "latched" in open or released position by skewing of the overlapping portions of the band. When utilized as a hose clamp, the clamp has an inherent quick-clamping characteristic which is particularly advantageous on production lines, for internal combustion engines or the like. Two of the clamps can be slipped on a hose previously cut to proper length and the clamps adjusted to their intermediate position, mentioned above. The compressive force then exerted on the hose by the clamps enables the clamps to stay in proper place on the hose length while it is in inventory and to be properly positioned for final assembly of the hose on the apparatus into which it is to be incorporated.

BRIEF DESCRIPTION OF THE DRAWINGS

FIG. 1 is a top plan view of the clamp of the present invention in place on a hub structure.

FIG. 2 is a top plan view of the hub structure prior to installation of the clamp.

FIG. 3 is a side sectional view taken generally along the line 3—3 of FIG. 1.

FIG. 4 is a top plan view of the clamp of the present invention shown in semi-released position.

FIG. 4 is a top plan view of the clamp of the present invention shown in completely released position.

FIG. 5 is an end view of the structure shown in FIG. 4, with the clamp in released position.

FIG. 6 is a top plan view of a modified form of the clamp of the present invention in place on a hub and in closed or locked position.

FIG. 7 is a side sectional view taken generally along the line 7—7 of FIG. 6.

FIG. 8 is a top plan view of the modified form of the clamp shown in FIG. 6 but illustrated in released or open position.

FIG. 9 is a sectional view of the structure shown in FIG. 8 with the clamp in released position and taken generally along the line 9—9 of FIG. 8.

BRIEF DESCRIPTION OF THE PREFERRED EMBODIMENTS

Referring initially to FIGS. 1-5 where use of the clamp is illustrated on a plastic fan hub, a plastic hub is illustrated at 10 and may have longitudinal slots 11 (FIG. 2) formed therein and extending axially along the tubular hub. The central opening in the hub may be D shaped in configuration and receives a drive shaft 12. The plastic hub 10 is locked on the shaft by the clamp of the present invention which encircles the hub and is indicated generally at 13.

The clamp 13 is formed by a circular band of a resilient material such as spring steel. The clamp has overlapping end portios, with one end portion 14 overlying the other end portion 15. Where used with a slotted hub, the clamp may be provided with two, diametrically opposed, inwardly directed tabs 16 and 17 which are closely received within the slots 11 and serve as rotational locating elements for the clamp on the hub. The clamp has a free inside diameter somewhat less than the outside diameter of the tubular hub, the band exerts a compressive force on the hub 10, effectively locking it to the drive shaft 12.

As may best be seen in FIGS. 1 and 3, the overlapping band portions 14 and 15 are each provided with generally rectangular apertures 14a and 15a respectively. The apertures 14a and 15a register over a part of their area, this registering portion being identified at 21 in FIGS. 1 and 3. The overlapping band end portions are provided with interfitting abutment surfaces which, as may best be seen in FIGS. 1 and 3, take the form of an upwardly turned tab 22 and a central notch 23 (FIG. 4), having stepped sidewalls, cut in the tip of the overlying end portion 14 of the clamp. The base, or taben-gaging portion 23a of the stepped sidewall of the notch 23, and the tab-engaging adjacent tip 23b of the band end portion 14 are inclined with relation to an imaginary line normal to the band side edges. This contour gives more extensive contact with the tab 22 when the band portions are skewed into their positions of FIG. 4 and 4A. When the clamp is in locked position on the hub as shown in FIG. 3, the tab 22, extending upwardly from the portion 15, fits centrally within the notch 23 in the portion 14 and defines the maximum limit of the compressive force exerted on the hub by the band. As will be evident from FIG. 4, when the overlapping end portions 14 and 15 of the band are moderately skewed with relation to each other, the notch side wall step surface 23a engages the tab 22. In this intermediate position, between fully clamped position (FIG. 1) and fully released position (FIG. 4A), a portion of the compressive force on the tubular hub 10 is relieved, however, the remaining compressive force exerted by the band is sufficient to retain the clamp in place on the hub during shipment, for example. The inclination of the step surface 23a is such as to place it parallel to the adjacent side surface of the tab 22 when the portions 14 and 15 are skewed as shown in FIG. 4.

As will be evident from FIG. 4A, when the overlapping end portions 14 and 15 are more sharply skewed, the tip surface 23b of portion 14 engages the tab 22. In this fully released, or open position, the clamp is loose on the hub and no compressive force is exerted on the underlying tubular hub. The inclination of the tip edge surface 23b is such as to place it parallel to the adjacent side surface of tab 22 when portions 14 and 15 are skewed to the degree shown in FIG. 4A.

To move the band to intermediate position, thereby releasing a portion of the compressive force on the hub exerted by the band, a screwdriver tip may be inserted in the registering aperture portion 21 and twisted. This tends to enlarge the registering area of the two rectangular apertures and skews the upper portion 14 with respect to the underlying portion 15 of the band as shown in FIG. 4. The enlarging action at the registering aperture portion 21 functions to spread or spring the band slightly causing the tab 22 to withdraw from the notch 23 and bringing the notch side wall step surface 23a into frictional engagement with the tab 22 as shown in FIGS. 4 and 5. The frictional engagement of the surface 23a with the tab 22 serves to prop or hold the clamp in intermediate or semi-released condition so that some compressive force remains exerted on the hub. The clamp band may thus be retained on the hub during transport or storage of the fan and can readily be locked into clamped position by a reverse twist at the registering aperture portions at the time of final assembly. Since the central notch 23 is symmetrical, as is the contour of the tip end of the band portion 14, the tool inserted in aperture 21 may be twisted in either direction and skewing of band portions 14 and 15 could be opposite to that shown in FIGS. 4 and 4A.

To move the clamp band to fully released, or open position, the screw driver tip may be further twisted, further enlarging the registering area 21 of the two rectangular apertures. This skews the band portions 14 and 15 more sharply, to their position of FIG. 4A. The inclined tip edge 23b is thus engaged by tab 22, as previously pointed out, and the clamp is thereby held in fully released position and is losse upon the hub 10. The clamp band can be readily returned to its position of FIG. 4, or to its position of FIG. 1 by a reverse twist of the inserted tool at the registering aperture portions 21. It is envisaged that the side wall stepped notch form 23, 23a, described above, might be replaced by a simple rectangular notch in some applications where an intermediate position for the clamp is not necessary. In the modified form of the invention described below such a simplified notch contour is illustrated.

Referring to FIGS. 6-9, the modified form of the clamp is there disclosed. As in the case of the embodiment previously described, the clamp is formed by a band 31 having overlapping end portions 32 and 33. Inwardly directed tabs 34 and 36 may be received in appropriate longitudinal slots in a hub 37 which accommodates a drive shaft 38, the hub 37 and the drived shaft 38 being substantially identical to the hub 10 and drive shaft 12 of FIG. 3. The tabs 34 and 36 and the tab-receiving slots provide a means for locating the clamp band on the hub in a position assuring that the screw-driver slot 42, to be subsequently identified, is accessibly positioned between the fan or blower wheel blades. The tab 36 extends from the inner terminus of the overlapping portion 23, while the tab 34 extends from an intermediate portion of the band diametrically opposite the tab 36. The tip 33a (FIG. 8) of the portion 33 has a rectangular notch 33b formed in it and this notch accommodates the inwardly extending tab 36. The tab 36 and the notch 33b thus function as the counterparts of the tab 22 and notch 23 of FIG. 1 and define the maximum compressive stress placed on the hub by the band. Adjacent its free end, the overlying portion 32 is provided with a rectangular aperture 39 and the underlying portion 33 is provided with a rectangular aperture 41, the apertures 39 and 41 being in register over a portion of their area, the registering portion being indicated at 42.

With the clamp in the position shown in FIG. 7 the tab 36 will be fitted within the notch 33b and the band will exert the maximum compressive force against the hub. The clamp may be released by inserting a tool, such as a screwdriver tip into the registering aperture portion 42. Twisting the tool tends to enlarge the registering portion of the apertures 39 and 41 thereby releasing the compressive force on the hub. This twisting motion of the tool also skews the underlying portion 33 with relation to the overlying portion 32 as may best be seen in FIGS. 8 and 9. The tip edge of the underlying portion 33 is placed in frictional engagement with the adjacent surface of the tab 36 thereby propping the clamp in released or enlarged condition.

I claim:

1. A circular clamp adapted to join a tubular member and a concentric central member extending into the tubular member, said clamp comprising a one-piece, circularly formed resilient band having overlapping end portions, said band having a free inside diameter somewhat less than the outside diameter of the tubular member so that when in place on the tubular member the band exerts a compressive force thereon locking it to the central member, said overlapping band end portions each having apertures therethrough which are in register over a portion only of their area, and interfitting abutment surfaces on said overlapping band end portions, said interfitting abutments comprising a central notch cut in the tip of one of said overlapping band end portions and an upwardly directed tab fitting within the notch and struck from the surface of the other of said overlapping band portions, said registering portion of said apertures being adapted to accomodate a tool which when twisted in one direction enlarges said registering aperture portion to disengage said interfitting abutment surfaces and release a substantial portion of said compressive force on the tubular member, said overlapping band end portions being skewed in relation to each other by the twisting motion of the tool thereby removing said abutment surfaces from interfitting engagement and permitting said overlapping band end portions to bear against each other to prop said band in coompressive force releasing position, twisting of the tool in reverse direction permitting the overlapping band end portions to return from their skewed relation to locking position on the central member with said interfitting abutment surfaces again engaged.

2. A clamp as claimed in claim 1 in which said interfitting abutment surfaces are formed by a tab extending from one of said overlapping band end portions and a central notch having stepped sidewalls cut in the tip of the other of said overlapping band end portions, the side wall step on said notch being adapted to engage said tab when said band end portions are moderately skewed to relieve a portion of said compressive force on the tubular member, said tip of the other overlapping band end portion adjacent said stepped notch engaging said tab when said band end portions are more sharply skewed to relieve a larger portion of said compressive force on the tubular member.

3. A clamp as claimed in claim 2 in which the tabengaging portion of said stepped notch sidewall and the tab-engaging tip of said other overlapping band end portion are inclined with relation to a line normal to the band edges to provide maximum contact area with said tab when said overlapping band end portions are skewed with relation to each other.

4. A clamp as claimed in claim 1 in which said intefitting abutments comprise a central notch (33b) cut in the tip of the underlying one of said overlapping band end portions and a tab (36) formed on said band adjacent said overlapping band end portions.

5. In combination, a fan hub clamp and a tubular fan hub of the type adapted to accommodate a fan drive shaft, said clamp comprising a one-piece, circularly formed resilient band having overlapping end portions with one overlapping end portion overlying the other, said band having a free inside diameter somewhat less than the outside diameter of said hub so that when in place on the hub the band exerts a compressive force of the hub locking it to a fan drive shaft, said overlapping band end portions each having apertures therethrough which are in register over a portion only of their area, and interfitting abutment surfaces on said overlapping band end portions, said registering portion of said apertures being adapted to closely accommodate a tool which when twisted in one direction enlarges said registering aperture portion to disengage said interfitting abutment surfaces and release a substantial portion of said compression force on the hub, said overlapping band end portions being skewed by the twisting motion of the tool thereby removing said abutment surfaces from intefitting engagement and permitting said overlapping end portions to bear against each other to prop said band in compressive force releasing position, twisting of the tool in reverse direction permitting the overlapping band end portions to return from their skewed relation to locking position on said hub with said interfitting abutment surfaces being engaged.

6. The combination claimed in claim 5 in which said interfitting abutments comprise a central notch cut in the tip of one of said overlapping band end portions and an upwardly directed tab fitting within the notch and struck from the surface of the other of said overlapping band end portions.

7. The combination claimed in claim 5 in which said hub has longitudinal slots therein and said band is provided with two diametrically opposed tabs, one of which is spaced from said overlapping band end portions, said opposed tabs being adapted to extend into said hub slots for positively locating said clamp on the hub.

8. The combination claimed in claim 5 in which said interfitting abutment surfaces are formed by a tab extending from one of said overlapping band end portions and a central notch having stepped sidewalls cut in the tip of the other of said overlapping band end portions, the side wall step on said notch being adapted to engage said tab when said band end portions are moderately skewed to relieve a portion of said compressive force on the hub, said tip of the other overlapping band end portion adjacent said stepped notch engaging said tab when said band end portions are more sharply skewed to relieve a larger portion of said compressive force on the hub.

* * * * *